(12) United States Patent
Koyabu et al.

(10) Patent No.: US 8,755,617 B2
(45) Date of Patent: Jun. 17, 2014

(54) IMAGE ENCODING DEVICE AND IMAGE ENCODING METHOD

(75) Inventors: Kyohei Koyabu, Kanagawa (JP); Takaaki Fuchie, Kanagawa (JP)

(73) Assignee: Sony Corporation, Tokyo (JP)

(*) Notice: Subject to any disclaimer, the term of this patent is extended or adjusted under 35 U.S.C. 154(b) by 285 days.

(21) Appl. No.: 12/840,626

(22) Filed: Jul. 21, 2010

(65) Prior Publication Data

US 2011/0019929 A1    Jan. 27, 2011

(30) Foreign Application Priority Data

Jul. 27, 2009   (JP) ............................... P2009-173909

(51) Int. Cl.
G06K 9/46 (2006.01)
G06K 9/36 (2006.01)
G06K 9/00 (2006.01)

(52) U.S. Cl.
USPC ........... 382/238; 382/233; 382/239; 382/250; 382/251

(58) Field of Classification Search
USPC .................. 382/232–233, 237–239, 250–253
See application file for complete search history.

(56) References Cited

U.S. PATENT DOCUMENTS 5,870,145 A    2/1999  Yada et al.
6,968,090 B2 * 11/2005  Yokose ......................... 382/251
2005/0254579 A1 * 11/2005  Kondo ....................... 375/240.03
2006/0256853 A1 * 11/2006  Schlockermann et al. ......................... 375/240.03
2008/0285866 A1 * 11/2008  Ishikawa ........................ 382/232
2009/0003716 A1 *  1/2009  Sekiguchi et al. ............. 382/238
2009/0034857 A1 *  2/2009  Moriya et al. ................ 382/238
2009/0067738 A1 *  3/2009  Fuchie et al. ................. 382/251
2009/0110063 A1 *  4/2009  Nakayama ............... 375/240.03
2010/0098173 A1 *  4/2010  Horiuchi et al. ......... 375/240.18

FOREIGN PATENT DOCUMENTS

WO       WO 96 28937           9/1996
WO       WO 2009035149 A1 *   3/2009 ......... H04N 7/26026

* cited by examiner

Primary Examiner — Matthew Bella
Assistant Examiner — Weiwen Yang
(74) Attorney, Agent, or Firm — Frommer Lawrence & Haug LLP; William S. Frommer; Ellen Marcie Emas

(57) ABSTRACT

An image encoding device includes: a first encoding unit for encoding image data using a fixed-quantizing parameter to calculate a generated code amount; a second encoding unit for encoding the image data using multiple different quantizing parameters for each of the quantizing parameters as the image data of an intra picture to calculate a generated code amount; a code amount control unit for determining a quantizing parameter by predicting a quantizing parameter for realizing a target generated code amount, and a generated code amount when employing this quantizing parameter based on the generated code amount calculated at the first encoding unit, and correcting this predicted generated code amount according to the generated code amount calculated at the second encoding unit so as to realize the target generated code amount; and a third encoding unit for encoding the image data using the quantizing parameter determined at the code amount control unit.

9 Claims, 12 Drawing Sheets

FIG. 2A
QMF

| 16 | 16 | 16 | 16 |
|----|----|----|----|
| 16 | 16 | 16 | 16 |
| 16 | 16 | 16 | 16 |
| 16 | 16 | 16 | 16 |

FIG. 2B
QMN

| 16 | 20 | 28 | 48 |
|----|----|----|----|
| 20 | 28 | 48 | 72 |
| 28 | 48 | 72 | 84 |
| 48 | 72 | 84 | 96 |

FIG. 2C
QMS

| 16  | 42  | 116 | 128 |
|-----|-----|-----|-----|
| 42  | 116 | 128 | 140 |
| 116 | 128 | 140 | 170 |
| 128 | 140 | 170 | 255 |

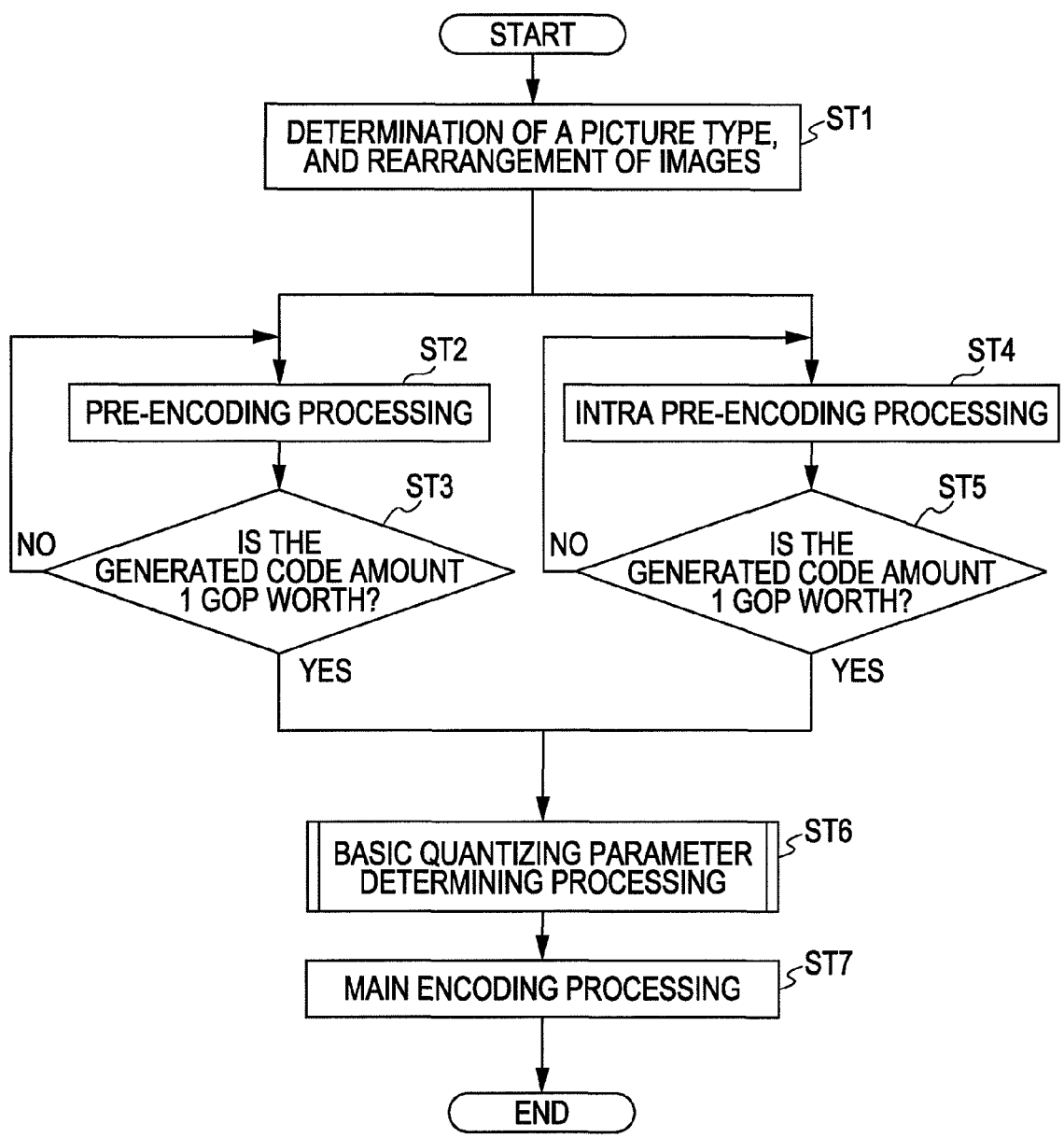

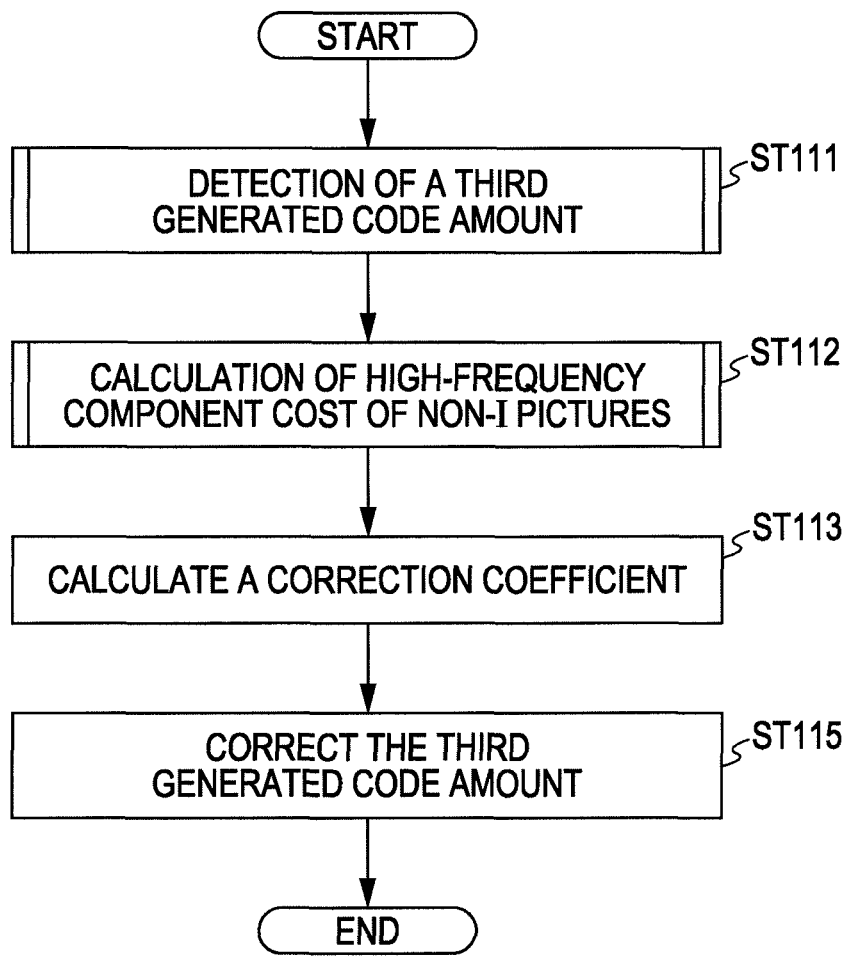

IMAGE ENCODING DEVICE AND IMAGE ENCODING METHOD

BACKGROUND OF THE INVENTION

1. Field of the Invention

The present invention relates to an image encoding device, and an image encoding method, and more specifically, it enables prediction of a generated code amount to be accurately performed at the time of performing encoding of an image.

2. Description of the Related Art

Hitherto, with an image encoding method such as MPEG2 (Moving Picture Experts Group 2) or the like, it is a great problem to maintain subjective image quality to ideally distribute a code amount.

For example, an ideal code amount distribution of a still image is a state in which distortion is uniformly encoded (with a fixed quantized scale). When reaching a code amount whereby this distortion becomes great, subjective image quality can be enhanced by biasing the distortion toward a high-frequency component or complicated portion.

Now, for example, with International Publication WO96/28937, an image signal encoding method has been disclosed wherein the image quality of a decoded image can be improved by employing code amount control according to a feed forward method to enable control adapted to the local property of an image quality signal. The feed forward method is for determining a suitable quantizing scale in a range where a generated code amount does not exceed a target generated code amount by calculating a code amount to be generated in increments of equal lengthening regarding a plurality of quantizing scales.

On the other hand, with code amount control such as TM5 proposed as a test model with MPEG2, or the like, code amount control is performed by performing feedback control using relationship between the remaining amount of a virtual buffer, a quantization index at the time of previous encoding, and a generated code amount.

SUMMARY OF THE INVENTION

Incidentally, with the above related art according to still images, in order to find an average quantizing scale for realizing uniformity of the entire screen close to a target generated code amount, prediction has to be performed multiple times by calculating a code amount using a different quantizing scale, and cost relating to a circuit for calculation increases.

Also, with feedback code amount control represented by the above TM5, a quantizing scale for providing a suitable generated amount each time switching to a different sequence is performed is not allowed to be applied. Therefore, the lower portion of the screen increases in distortion as compared to the upper portion thereof, which becomes conspicuous visually, an excessive code amount is generated at the time of entering a sequence, the code amount has to be suppressed, and deterioration in image quality becomes conspicuous.

Such a problem may be solved by knowing a generated code amount at the time of performing quantization using a certain value beforehand. For example, in the case of MPEG2, particularly MPEG2 intra, as the frequency of a DCT coefficient advances from a low frequency to a high frequency, the value becomes small. In the case of natural images, this constantly holds. Thus, correlation between the code amount and coefficient distribution of a macro block is strong, and prediction may be made using a code amount alone.

However, with H264/AVC, there is intra-screen prediction (an image obtained by subtracting a predictive image from an input image, i.e., difference image) or the like even with an intra macro block, and in the case that such a rule does not hold, the same distribution as the distribution of the DCT coefficient in the MPEG2 is not realized. Accordingly, estimation of an accurate generated code amount may not be performed even through the same method as the method compatible with the MPEG2.

It has been found to be desirable to provide an image encoding device and an image encoding method whereby prediction of a generated code amount can accurately be performed.

An embodiment of the present invention is an image encoding device including: a first encoding unit configured to perform encoding of image data using a fixed quantizing parameter to calculate a generated code amount; a second encoding unit configured to perform encoding of the image data using a plurality of different quantizing parameters for each of the quantizing parameters as the image data of an intra picture to calculate a generated code amount; a code amount control unit configured to determine a quantizing parameter by performing prediction of a quantizing parameter for realizing a target generated code amount, and a generated code amount at the time of employing this quantizing parameter based on the generated code amount calculated at the first encoding unit, and correcting this predicted generated code amount according to the generated code amount calculated at the second encoding unit such that the generated code amount after correction realizes the target generated code amount; and a third encoding unit configured to perform encoding of the image data using the quantizing parameter determined at the code amount control unit.

According to the above configuration, a generated code amount is calculated by the first encoding unit performing the pre-encoding processing of image data using a fixed quantizing parameter. Also, a generated code amount is calculated by the second encoding unit performing the pre-encoding processing using multiple different quantizing parameters with the image data as the image data of an intra picture (I picture). The code amount control unit performs prediction of a quantizing parameter for realizing a target generated code amount, and a generated code amount at the time of employing this quantizing parameter based on the generated code amount calculated by the first encoding unit performing the pre-encoding processing, and corrects the predicted generated code amount based on the generated code amount calculated by the second encoding unit performing the pre-encoding processing. For example, in the event that an I picture has been encoded by the first encoding unit, the generated code amount at the predicted quantizing parameter is calculated from the generated code amount calculated at the second encoding unit, and this calculated generated code amount is taken as the generated code amount of the I picture encoded at the first encoding unit. Also, in the event that a picture different from an I picture has been encoded at the first encoding unit, high-frequency component cost is calculated from the generated code amount calculated at the second encoding unit, the predicted generated code amount is corrected according to the percentage as to the high-frequency component cost of an I picture, and this generated code amount after correction is taken as the generated code amount of a picture different from an I picture. Further, with the code amount control unit, a quantizing parameter is determined so that the generated code amount for 1 GOP (Group of Picture) worth thus predicted realizes the target generated code amount. Also, in the event that image data has been distinguished to include many high-frequency components based on the high-frequency component cost, and in the case that correction is performed according to the generated code amount calculated at the second encoding unit, upon switching being performed regarding whether or not correction is performed according to the generated code amount calculated at the second encoding unit within the GOP, operation after switching is continued until the final picture of the GOP. With the third encoding unit, encoding of image data is performed using the quantizing parameter determined by the pre-encoding processing.

Another embodiment of the present invention is an image encoding method including the steps of: first encoding, performed by a first encoding unit, of image data using a fixed quantizing parameter to calculate a generated code amount; second encoding, performed by a second encoding unit, of the image data using a plurality of different quantizing parameters for each of the quantizing parameters as the image data of an intra picture to calculate a generated code amount; determining, with a code amount control unit, of a quantizing parameter by performing prediction of a quantizing parameter for realizing a target generated code amount, and a generated code amount at the time of employing this quantizing parameter based on the generated code amount calculated at the first encoding unit, and correcting of this predicted generated code amount according to the generated code amount calculated at the second encoding unit such that the generated code amount after correction realizes the target generated code amount; and third encoding, performed by a third encoding unit, of the image data using the quantizing parameter determined at the code amount control unit.

According to the above configuration, a generated code amount at the time of encoding image data using a fixed quantizing parameter is calculated by the first encoding unit. Also, a generated code amount at the time of encoding the image data using multiple different quantizing parameters for each quantizing parameter as the image data of an intra picture is calculated by the second encoding unit. With the code amount control unit, a quantizing parameter for realizing a target generated code amount, and generated code amount at the time of employing this quantizing parameter are predicted based on the generated code amount calculated at the first encoding unit, and this predicted generated code amount is corrected according the generated code amount calculated at the second encoding unit. Further, a quantizing parameter is determined so that the generated code amount after correction realizes the target generated code amount. Also, with the third encoding unit, encoding of the image data is performed using the quantizing parameter determined at the code amount control unit.

Therefore, before encoding of the image data is performed at the third encoding unit, prediction of a generated code amount is accurately performed, and a quantizing parameter for realizing the target generated code amount is determined, and accordingly, encoding processing can be performed at the third encoding unit wherein the generated code amount is equal to or smaller than the target generated code amount, so deterioration in the image is small.

BRIEF DESCRIPTION OF THE DRAWINGS

FIGS. 2A through 2C are diagrams illustrating quantizing matrices;

FIG. 3 is a flowchart illustrating the operation of the image encoding device;

FIG. 12 is a flowchart illustrating non-I picture generated code amount calculation processing at the time of employing a predictive quantizing parameter.

DESCRIPTION OF THE PREFERRED EMBODIMENTS

An embodiment for implementing the present invention will be described below. With the present invention, a generated code amount is calculated by a pre-encoding unit serving as a first encoding unit performing pre-encoding processing of image data using a fixed quantizing parameter. Also, a generated code amount is calculated by an intra pre-encoding unit serving as a second encoding unit performing pre-encoding using multiple different quantizing parameters with image data as the image data of an intra picture (I picture). A code amount control unit predicts a quantizing parameter for realizing a target generated code amount, and a generated code amount at the time of employing this quantizing parameter based on the generated code amount calculated by the pre-encoding unit performing the pre-encoding processing. Also, the code amount control unit corrects the predicted generated code amount according to the generated code amount calculated by the intra pre-encoding unit, thereby enabling prediction of the generated code amount to be accurately performed. Further, the code amount control unit determines a quantizing parameter so that the generated code amount after correction realizes the target generated code amount. A main encoding unit serving as a third encoding unit performs encoding of the image data using the determined quantizing parameter, thereby enabling encoding processing to be performed wherein the generated code amount is equal to or smaller than the target generated code amount, and deterioration in the image is small. Note that description will be made in accordance with the following sequence.

Figure 1:
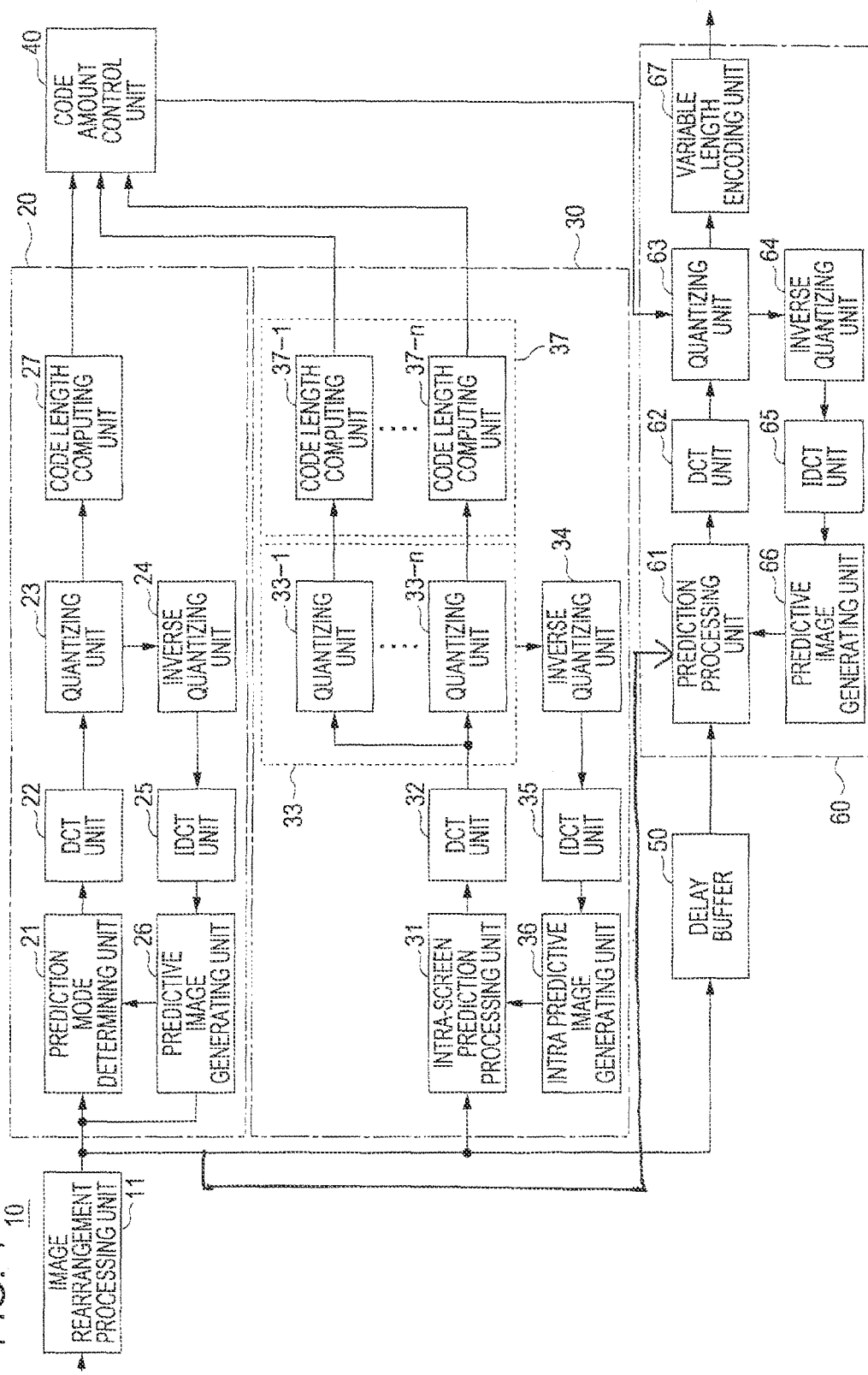
FIG. 1 is a diagram illustrating the configuration of an image encoding device.

1. Configuration of Image Encoding Device
2. Operation of Image Encoding Device
1. Configuration of Image Encoding Device FIG. 1 illustrates the configuration of an image encoding device according to an embodiment of the present invention. An image encoding device 10 includes an image rearrangement processing unit 11, a pre-encoding unit 20, an intra pre-encoding unit 30, a code amount control unit 40, a delay buffer 50, and a main encoding unit 60.

The pre-encoding unit 20 includes a prediction mode determining unit 21, a DCT (Discrete Cosine Transform) unit 22, a quantizing unit 23, an inverse quantizing unit 24, an IDCT (Inverse Discrete Cosine Transform) unit 25, a predictive image generating unit 26, and a code length computing unit 27.

The intra pre-encoding unit 30 includes an intra-screen prediction processing unit 31, a DCT unit 32, a quantizing unit 33, an inverse quantizing unit 34, an IDCT unit 35, an intra predictive image generating unit 36, and a code length computing unit 37. Also, the quantizing unit 33 is configured of multiple stages of quantizing units 33-1 through 33-n, and the code length computing unit 37 is configured of multiple stages of code length computing units 37-1 through 37-n.

The main encoding unit 60 includes a prediction processing unit 61, a DCT unit 62, a quantizing unit 63, an inverse quantizing unit 64, an IDCT unit 65, a predictive image generating unit 66, and a variable length encoding unit 67.

With such a configuration, the image rearrangement processing unit 11 rearranges the image data of an input image in the sequence of pictures from the display sequence to the encoding sequence in accordance with, for example, a GOP (Group of Picture) configuration. Subsequently, the image rearrangement processing unit 11 outputs the image data rearranged in the encoding sequence to the pre-encoding unit 20, the intra pre-encoding unit 30, and the delay buffer 50.

The pre-encoding unit 20 performs calculation of a generated code amount when encoding of the image data has been performed using a fixed quantizing parameter, and outputs the calculated generated code amount to the code amount control unit 40. The prediction mode determining unit 21 of the pre-encoding unit 20 determines a prediction mode for each macro block using the image data of the input image, and the predictive image data generated at the later-described predictive image generating unit 26. Also, the prediction mode determining unit 21 uses the predictive image data of the determined prediction mode to output difference image data indicating error as to the image data of the input image to the DCT unit 22.

The DCT unit 22 performs discrete cosine transform as to the difference image data to generate a DCT coefficient, and outputs this to the quantizing unit 23.

The quantizing unit 23 performs quantization of the DCT coefficient using a fixed quantizing parameter QP(p), and outputs the generated quantized data to the inverse quantizing unit 24 and the code length computing unit 27.

The inverse quantizing unit 24 performs inverse quantization as to the quantized data to generate a DCT coefficient, and outputs this to the IDCT unit 25.

The IDCT unit 25 performs inverse discrete cosine transform of the DCT coefficient supplied from the inverse quantizing unit 24 to generate difference image data, and outputs this to the predictive image generating unit 26.

The predictive image generating unit 26 uses the difference image data to generate the image data of a local decoded image. Also, the predictive image generating unit 26 uses the image data of the input image to perform motion estimation between the current frame and the next temporally adjacent frame in increments of macro blocks. Further, the predictive image generating unit 26 performs motion compensation of the local decoded image based on the motion estimation result to generate predictive image data from the image data of the local decoded image, and outputs this to the prediction mode determining unit 21.

The code length computing unit 27 performs encoding as to the quantized data using either the Context-Adaptive Variable Length Coding (CAVLC) method or the Context-Adaptive Binary Arithmetic Coding (CABAC) method, calculates a generated code amount for each macro block, and outputs this to the code amount control unit 40.

The CAVLC method is a method simpler than the CABAC method, and the CABAC method is a method whereby data amount can be reduced as compared to the CAVLC method. Now, description will be made regarding a case where the variable length coding method is employed at the pre-encoding unit 20 for simplifying the processing, and the arithmetic coding method is employed at the main encoding unit 60 for reducing data amount. With the variable length coding, the information of a certain region is effectively encoded, and with the arithmetic coding, a region can effectively be encoded without being identified. Accordingly, great error may be caused when predicting a code amount of the arithmetic coding from the variable length coding. However, the CAVLC can effectively encode a region without identifying the region well as compared to common variable length coding by adaptively changing context. Thus, the error is reduced, and a generated code amount at the time of employing the CABAC method can be estimated by encoding according to the CAVLC method. Accordingly, a generated code amount at the main encoding unit 60 employing the CABAC method can also be estimated by employing the CAVLC method at the code length computing unit 27. Note that the code length computing unit 27 can also suppress the circuit scale by employing the CAVLC method.

The intra pre-encoding unit 30 performs encoding using multiple different quantizing parameters with all of the image data as I pictures, and calculates a generated code amount for each of the quantizing parameters to output this to the code amount control unit 40. The intra-screen prediction processing unit 31 of the intra pre-encoding unit 30 generates difference image data indicating error between the image data of the input image, and the predictive image data generated at the intra predictive image generating unit 36 to output this to the DCT unit 32.

The DCT unit 32 performs discrete cosine transform as to the difference image data to generate a DCT coefficient, and outputs this to the quantizing unit 33.

The quantizing unit 33 is configured of multiple stages, e.g., nine stages of quantizing units 33-1 through 33-9. The quantizing units 33-1 through 33-9 perform quantization in accordance with nine conditions by combining three different quantizing parameters QP(i0), QP(i1), and QP(i2), and three different quantizing matrices QMF, QMN, and QMS. The quantizing units 33-1 through 33-9 outputs the quantized data obtained by performing quantization of the DCT coefficient to the code length computing unit 37. Also, the quantizing unit 33 selects one of the quantized data generated at the quantizing units 33-1 through 33-9, and outputs this to the inverse quantizing unit 34.

FIGS. 2A through 2C exemplify the quantizing matrices QMF, QMN, and QMS. FIG. 2A illustrates the quantizing matrix QMF. With the quantizing matrix QMF, all matrix values are equal values. That is to say, the quantizing matrix QMF is a quantizing matrix having a flat property. FIG. 2B illustrates the quantizing matrix QMN. With the quantizing matrix QMN, the matrix value of a high-frequency component is greater than the matrix value of a low-frequency component. That is to say, the quantizing matrix QMN is a quantizing matrix having a common property wherein reduction of high-frequency components is performed. FIG. 2C illustrates the quantizing matrix QMS. With the quantizing matrix QMS, the matrix value of a high-frequency component is a further greater value as compared to the quantizing matrix QMN. That is to say, the quantizing matrix QMS is a quantizing matrix having a property wherein reduction of high-frequency components is further increased as compared to the quantizing matrix QMN.

The inverse quantizing unit 34 performs inverse quantization as to the quantized data supplied from the quantizing unit 33 to generate DCT coefficient data, and outputs this to the IDCT unit 35.

The IDCT unit 35 performs inverse discrete cosine transform of the DCT coefficient data supplied from the inverse quantizing unit 34 to generate difference image data, and outputs this to the intra predictive image generating unit 36.

The intra predictive image generating unit 36 uses the difference image data to generate the image data of the local decoded image. Also, the intra predictive image generating unit 36 outputs the image data of the local decoded image to the intra-screen prediction processing unit 31 as predictive image data.

The code length computing unit 37 is configured of multiple stages, e.g., nine stages of code length computing units 37-1 through 37-9 corresponding to the quantizing unit 33. The code length computing units 37-1 through 37-9 perform encoding using the same method as with the code length computing unit 27 of the pre-encoding unit 20 to calculate a generated code amount for each macro block, and output this to the code amount control unit 40.

The code amount control unit 40 determines a target generated code amount to be assigned to 1 GOP from relationship between a bit rate and a GOP configuration. The code amount control unit 40 predicts a quantizing parameter for realizing a target generated code amount, and a generated code amount when employing this quantizing parameter based on 1 GOP worth of the generated code amount calculated at the pre-encoding unit 20. That is to say, the code amount control unit 40 predicts a quantizing parameter wherein the generated code amount of 1 GOP is equal to or smaller than the target generated code amount and most closely approximating the target generated code amount, and a generated code amount when employing this quantizing parameter. Also, the code amount control unit 40 corrects the predicted generated coded amount in accordance with the generated code amount calculated at the intra pre-encoding unit 30. Further, the code amount control unit 40 determines a quantizing parameter for realizing the target generated code amount from the generated code amount after correction to output this to the main encoding unit 60. Note that, with the following description, a quantizing parameter for realizing the target generated code amount will be referred to as a basic quantizing parameter.

The delay buffer 50 delays the image data of the input image by the time used for processing for determining the basic quantizing parameter at the code amount control unit 40, and outputs the delayed image data to the main encoding unit 60.

The main encoding unit 60 performs encoding of the image data using the basic quantizing parameter determined at the code amount control unit 40. The prediction processing unit 61 of the main encoding unit 60 selects predictive image data according to the picture type determined by the prediction mode determining unit 21 of the pre-encoding unit 20. Also, the prediction processing unit 61 generates a difference image indicating error between the selected predictive image data, and the image data of the input image delayed at the delay buffer 50, and outputs this to the DCT unit 62.

The DCT unit 62 performs discrete cosine transform as to the difference image data to generate a DCT coefficient, and outputs this to the quantizing unit 63.

The quantizing unit 63 uses the quantization parameter determined at the code amount control unit 40 to perform quantization of the DCT coefficient, and outputs the quantized data to the inverse quantizing unit 64 and the variable length encoding unit 67.

The inverse quantizing unit 64 performs inverse quantization as to the quantized data to generate a DCT coefficient, and outputs this to the IDCT unit 65.

The IDCT unit 65 performs inverse discrete cosine transform of the DCT coefficient supplied from the inverse quantizing unit 64 to generate difference image data, and outputs this to the predictive image generating unit 66.

The predictive image generating unit 66 uses the difference image data to generate the image data of a local decoded image. Also, the predictive image generating unit 66 uses the image data from the delay buffer 50 to perform motion estimation between the current frame and the next temporally adjacent frame in increments of macro blocks. Further, the predictive image generating unit 66 performs motion compensation of the local decoded image based on the motion estimation result to generate a predictive image, and outputs this to the prediction processing unit 61.

The variable length encoding unit 67 performs encoding as to the quantized data by the CAVLC method or CABAC method to generate encoded streams, and outputs these. The variable length encoding unit 67 performs encoding of the quantized data using the CABAC method, for example, so as to reduce the data amount, to generate encoded streams.

2. Operation of Image Encoding Device

Next, the operation of the image encoding device will be described. FIG. 3 is a flowchart illustrating the operation of the image encoding device.

In step ST1, the image encoding device 10 performs determination of a picture type, and image rearrangement. The image encoding device 10 determines a picture type as to the input image, for example, in accordance with a GOP (Group of Picture) configuration. Also, the image encoding device 10 rearranges the image data of the input image at the image rearrangement processing unit 11 from the display sequence to the encoding sequence, and proceeds to step ST2.

In step ST2, the image encoding device 10 performs pre-encoding processing. The image encoding device 10 encodes the image data of the input image at the pre-encoding unit 20 using the determined picture type to calculate a generated code amount, and proceeds to step ST3.

In step ST3, the image encoding device 10 distinguishes whether or not the generated code amount has reached 1 GOP worth. In the event that the generated code amount calculated at the pre-encoding unit 20 has reached 1 GOP worth, the image encoding device 10 proceeds to step ST6, and in the event that the generated code amount has not reached 1 GOP worth, returns to step ST2.

In step ST4, the image encoding device 10 performs intra pre-encoding processing. The image encoding device 10 encodes the image data of the input image at the intra pre-encoding unit 30 as I picture to calculate a generated code amount, and proceeds to step ST5. Also, the image encoding device 10 performs encoding in parallel using multiple different quantizing parameters and multiple different quantizing matrices in the intra pre-encoding processing to calculate a generated code amount.

In step ST5, the image encoding device 10 distinguishes whether or not the generated code amount has reached 1 GOP worth. In the event that the generated code amount calculated at the intra pre-encoding unit 30 has reached 1 GOP worth, the image encoding device 10 proceeds to step ST6. Also, in the event that the generated code amount has not reached 1 GOP worth, the image encoding device 10 returns to step ST4.

In step ST6, the image encoding device 10 performs basic quantizing parameter determining processing to be used in main encoding processing. The image encoding device 10 determines a basic quantizing parameter to be used for the main encoding processing at the code amount control unit 40 from the generated code amount obtained by performing the pre-encoding processing, and the generated code amount obtained by performing the intra pre-encoding processing.

In step ST7, the image encoding device 10 performs the main encoding processing. The image encoding device 10 uses the basic quantizing parameter determined in step ST6 to encode the image data of the input image at the main encoding unit 60.

Next, the basic quantizing parameter determining processing to be used for the main encoding processing will be described. With the basic quantizing parameter determining processing, a quantizing parameter for realizing the target generated code amount, and a generated code amount at the time of employing this quantizing parameter, are predicted based on the generated code amount calculated at the pre-encoding unit 20. Also, this predicted generated code amount is corrected according to the generated code amount calculated at the intra pre-encoding unit 30. When the target generated code amount is not realized by 1 GOP worth of the corrected generated code amount, prediction of a generated code amount, and correction thereof are preformed by changing the parameter value of the predicted quantizing parameter. When the target generated code amount is realized by 1 GOP worth of the corrected generated code amount, the quantizing parameter at this time is taken as a basic quantizing parameter.

Figure 4:
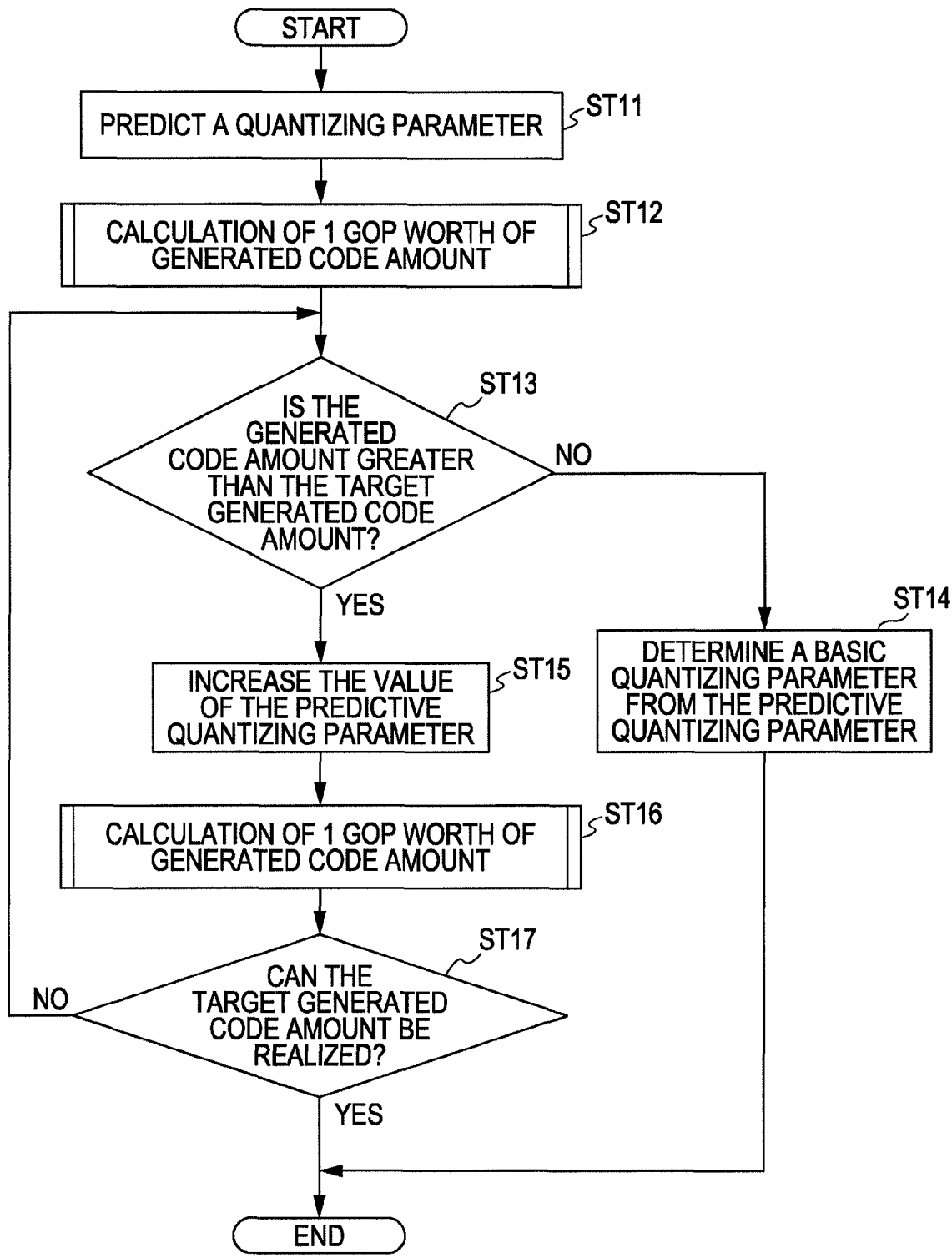
FIG. 4 is a flowchart illustrating basic quantizing parameter determining processing.

FIG. 4 exemplifies a flowchart illustrating the basic quantizing parameter determining processing to be used for the main encoding processing. In step ST11, the code amount control unit 40 performs prediction of a quantizing parameter. The code amount control unit 40 predicts a quantizing parameter for realizing the target generated code amount based on the generated code amount calculated at the pre-encoding unit 20, and proceeds to step ST12.

Figure 5:
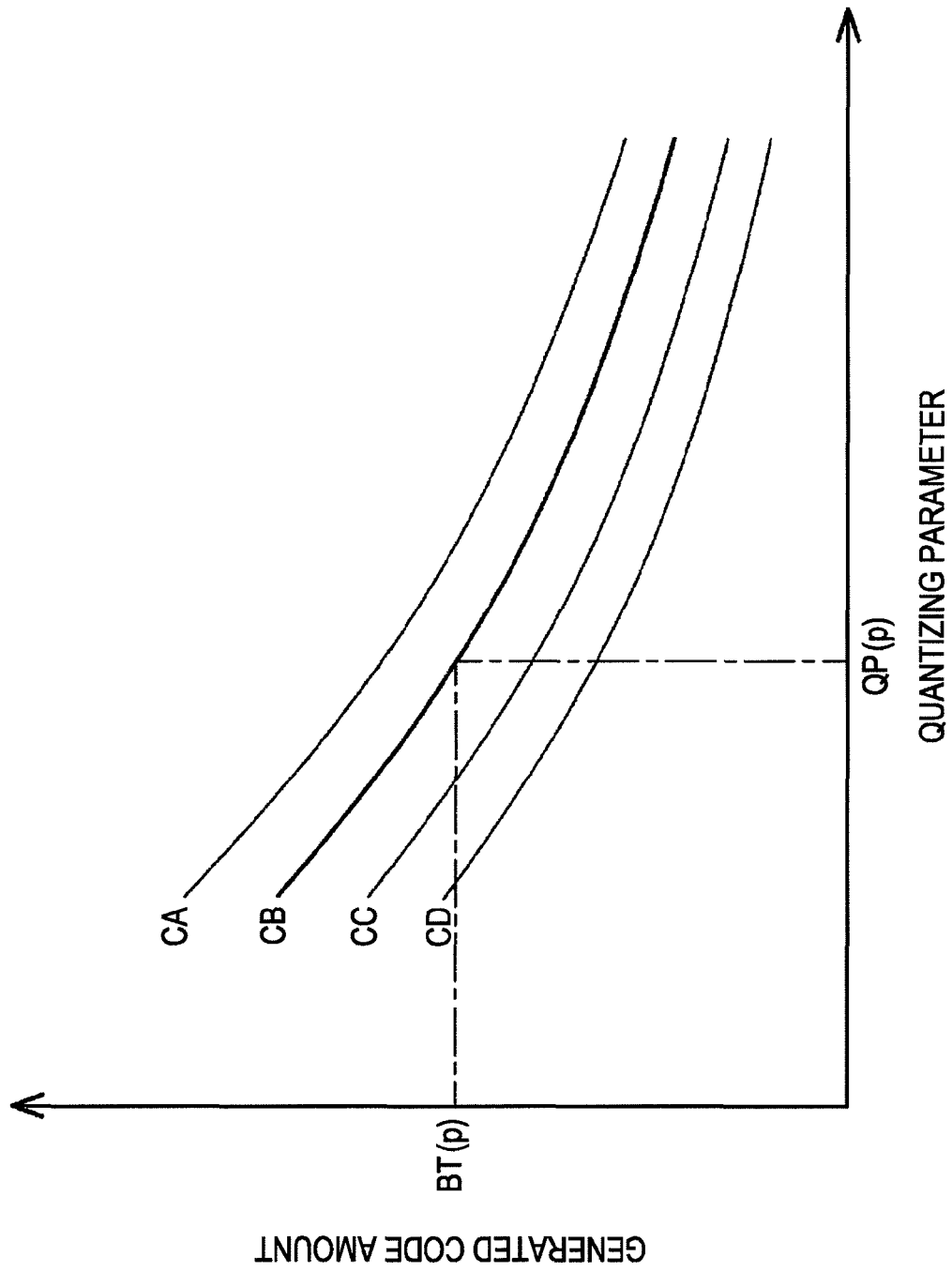
FIG. 5 is a diagram (part 1) for describing processing for calculating a quantizing parameter and a generated code amount.
Figure 6:
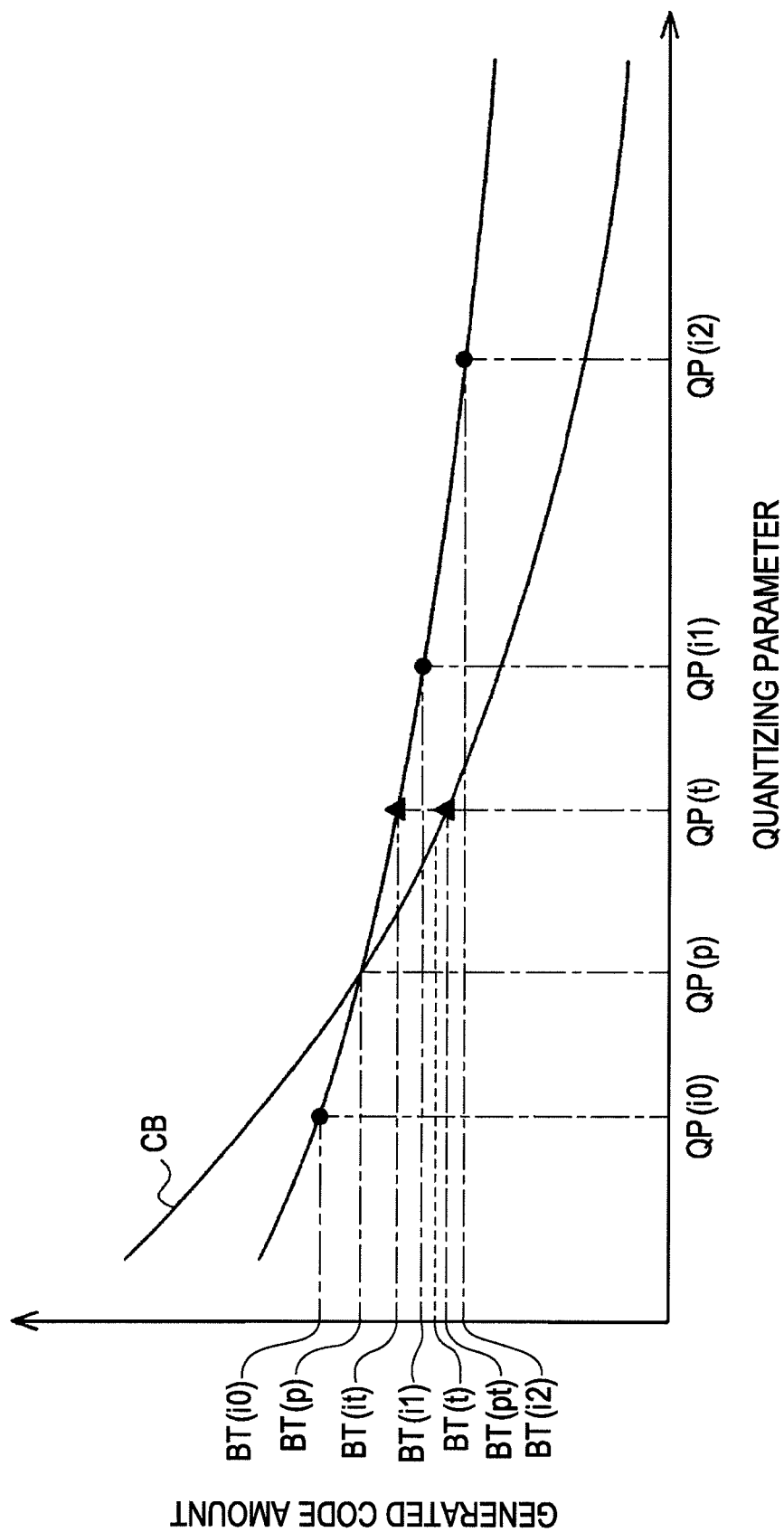
FIG. 6 is a diagram (part 2) for describing the processing for calculating a quantizing parameter and a generated code amount.

FIGS. 5 and 6 are diagrams for describing processing for calculating a quantizing parameter, and a generated code amount. The code amount control unit 40 classifies the macro blocks into groups using a fixed quantizing parameter QP(p) according to a generated code amount BT(p) at the time of performing encoding at the pre-encoding unit 20. Also, such as illustrated in FIG. 5, the predictive curve of the corresponding group, e.g., a predictive curve CB is selected from multiple predictive curves indicating relationship a quantizing parameter and a generated code amount provided beforehand for each group. Further, such as illustrated in FIG. 6, a quantizing parameter of which the generated code amount is equal to or smaller than the target generated code amount BT(t) and most closely approximated thereto is predicted using the selected predictive curve CB.

In step ST12, the code amount control unit 40 calculates 1 GOP worth of generated code amount. The code amount control unit 40 corrects the generated code amount predicted in step ST11 according to the generated code amount calculated at the intra pre-encoding unit 30, and calculates 1 GOP worth of the corrected generated code amount, and proceeds to step ST13.

In step ST13, the code amount control unit 40 distinguishes whether or not 1 GOP worth of generated code amount is greater than the target generated code amount. When the generated code amount is not greater than the target generated code amount, the code amount control unit 40 proceeds to step ST14, and when the generated code amount is greater than the target generated code amount, proceeds to step ST15.

In step ST14, the code amount control unit 40 determines a basic quantizing parameter from the predicted quantizing parameter. When difference between the generated code amount and the target generated code amount is small, e.g., when the difference is smaller than the increase of the generated code amount at the time of reducing the value of the predicted quantizing parameter by one for example, the code amount control unit 40 takes the predicted quantizing parameter as a basic quantizing parameter, and ends the processing. Also, when difference between the generated code amount and the target generated code amount is great, the code amount control unit 40 reduces the value of the predicted quantizing parameter so as to reduce the difference, and takes this as a basic quantizing parameter.

In step ST15, the code amount control unit 40 increases the value of the predicted quantizing parameter. The code amount control unit 40 determines an increment according to the difference between the generated code amount and the target generated code amount, increases the value of the predicted quantizing parameter, and proceeds to step ST16.

In step ST16, the code amount control unit 40 calculates 1 GOP worth of generated code amount. The code amount control unit 40 uses the quantizing parameter updated in step ST115 to calculate 1 GOP worth of generated code amount in the same way as in step ST12, and proceeds to step ST17.

In step ST17, the code amount control unit 40 distinguishes whether or not the target generated code amount is realizable. In the event that distinction is made that the target generated code amount is unrealizable, the code amount control unit 40 returns to step ST13, and in the event that distinction is made that the target generated code amount is realizable, takes the quantizing parameter updated in step ST15 as a basic quantizing parameter, and ends the processing. For example, when a generated code amount at the time of employing the quantizing parameter updated in step ST15 is equal to or smaller than the target generated code amount, and a generated code amount at the time of employing a quantizing parameter smaller than the quantizing parameter updated in step ST15 by one exceeds the target generated code amount, the code amount control unit 40 distinguishes that the target generated code amount is realizable, and takes the updated quantizing parameter as a basic quantizing parameter.

Thus, a basic quantizing parameter can be determined whereby the target generated code amount can be realized. Note that the basic quantizing parameter determining processing is not restricted to the processing illustrated in the flowchart in FIG. 4. For example, the increment or decrement of a quantizing parameter is set according to the difference between the generated code amount and the target generated code amount to calculate a generated code amount again. Also, when the difference between the generated code amount and the target generated code amount is small, a quantizing parameter whereby the target generated code amount can be realized may be searched by increasing or decreasing the quantizing parameter by one at a time.

Figure 7:
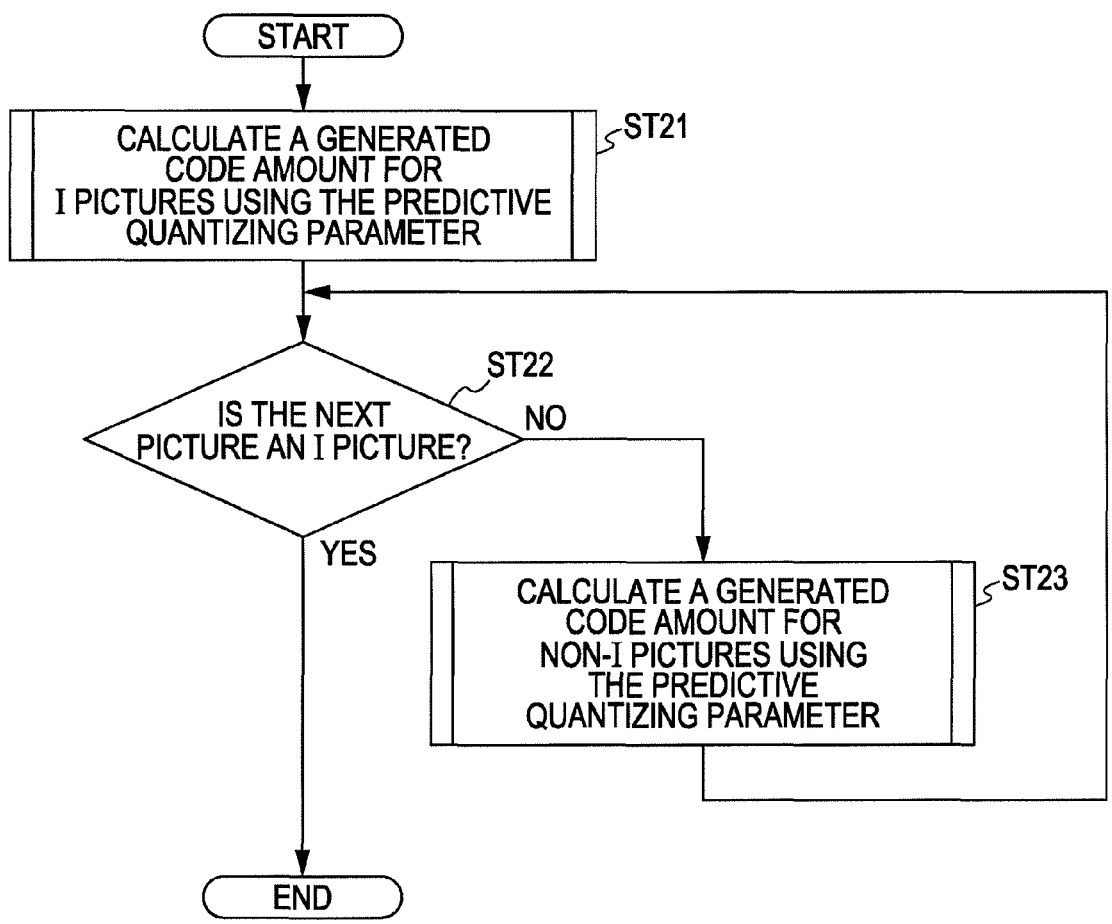
FIG. 7 is a flowchart illustrating processing for calculating 1 GOP worth of generated code amount.

FIG. 7 is a flowchart exemplifying 1 GOP worth of generated code amount calculation processing. In step ST21, the code amount control unit 40 calculates the generated code amount of an I picture using the predicted quantizing parameter, and proceeds to step ST22.

In step ST22, the code amount control unit 40 distinguishes whether or not the next picture is an I picture. When the next picture is not an I picture, the code amount control unit 40 proceeds to step ST23, and when the next picture is an I picture, ends the 1 GOP worth of generated code amount calculation processing.

In step ST23, the code amount control unit 40 uses the predicted quantizing parameter to calculate the generated code amount of a non-I picture, i.e., a P picture or B picture, and proceeds to step ST22.

Next, description will be made regarding processing for predicting the generated code amount of an I picture, and the generated code amount of a non-I picture using the predicted quantizing parameter.

In the event of predicting the generated code amount of an I picture using the predicted quantizing parameter, the code amount control unit 40 predicts a generated code amount at the time of the predicted quantizing parameter being employed based on the generated code amount of the pre-encoding processing. This predicted generated code amount will be referred to as a first generated code amount. Also, the code amount control unit 40 calculates a generated code amount at the time of the predicted quantizing parameter being employed from the generated code amount obtained in the intra pre-encoding processing. This calculated generated code amount will be referred to as a second generated code amount. The code amount control unit 40 calculates a correction coefficient from the first generated code amount and the second generated code amount. Further, the code amount control unit 40 corrects the first generated code amount by the calculated correction coefficient, and takes the first generated code amount after correction as the generated code amount of an I picture at the time of the predicted quantizing parameter being employed. Also, the code amount control unit 40 calculates high-frequency component cost indicating the state of a high-frequency component in an I picture, and uses the calculated high-frequency component cost to perform correction of the first generated code amount.

In the event of predicting the generated code amount of a non-I picture using the predicted quantizing parameter, the code amount control unit 40 predicts a generated code amount at the time of the predicted quantizing parameter being employed based on the generated code amount of the pre-encoding processing. This predicted generated code amount will be referred to as a third generated code amount. Also, the code amount control unit 40 calculates a correction coefficient in a non-I picture, uses this correction coefficient to perform correction of the third generated code amount, and takes the third generated code amount after correction as the generated code amount of a non-I picture at the time of the predicted quantizing parameter being employed.

Figure 8:
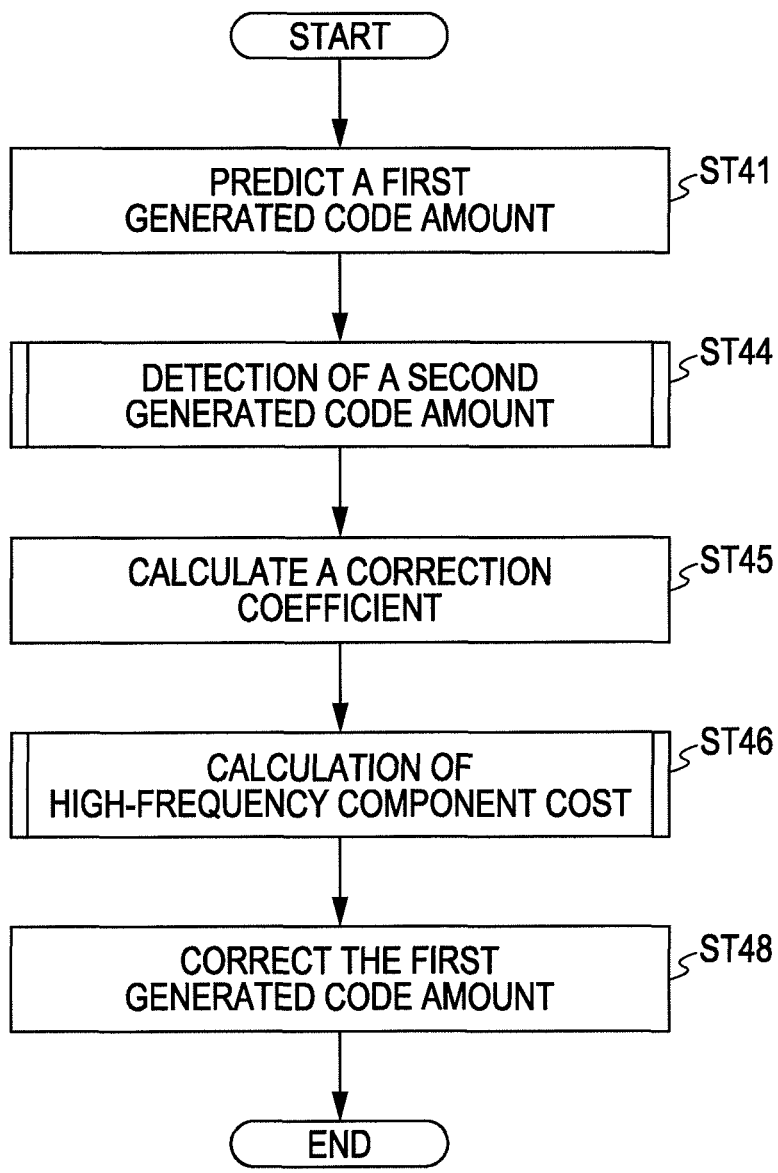
FIG. 8 is a flowchart illustrating I picture generated code amount calculation processing at the time of employing a predictive quantizing parameter.

FIG. 8 is a flowchart illustrating generated code amount calculation processing for I pictures at the time of the predicted quantizing parameter being employed.

In step ST41, the code amount control unit 40 predicts the first generated code amount. The code amount control unit 40 predicts a generated code amount at the time of employing the predicted quantizing parameter, takes this as the first generated code amount, and proceeds to step ST44. For example, such as illustrated in FIG. 6, the code amount control unit 40 uses the selected predictive curve CB to predict a quantization parameter whereby the generated code amount has a value equal to or less than the target generated code amount BT(t) and most closely approximated thereto, and predicts a generated code amount at the time of employing this predicted quantizing parameter. That is to say, the code amount control unit 40 takes the generated code amount BT(pt) of the predicted quantizing parameter QP(t) as the first generated code amount, and proceeds to step ST44. Note that the quantizing parameter QP(p) should be set to a small value beforehand so that the generated code amount at the time of performing encoding using the quantizing parameter QP(p) becomes greater than the target generated code amount. In the event of thus setting the quantizing parameter QP(p), a basic quantizing parameter can be set so as to decrease the generated code amount equal to or smaller than the target generated code amount and most closely approximated thereto.

In step ST44, the code amount control unit 40 detects the second generated code amount. The code amount control unit 40 detects the generated code amount BT(it) in the quantizing parameter QP(t) from the generated code amounts BT(i0), BT(i1), and BT(i2) at the time of performing encoding using the quantizing parameters QP(i0) through QP(i2), and takes this as the second generated code amount.

Figure 9:
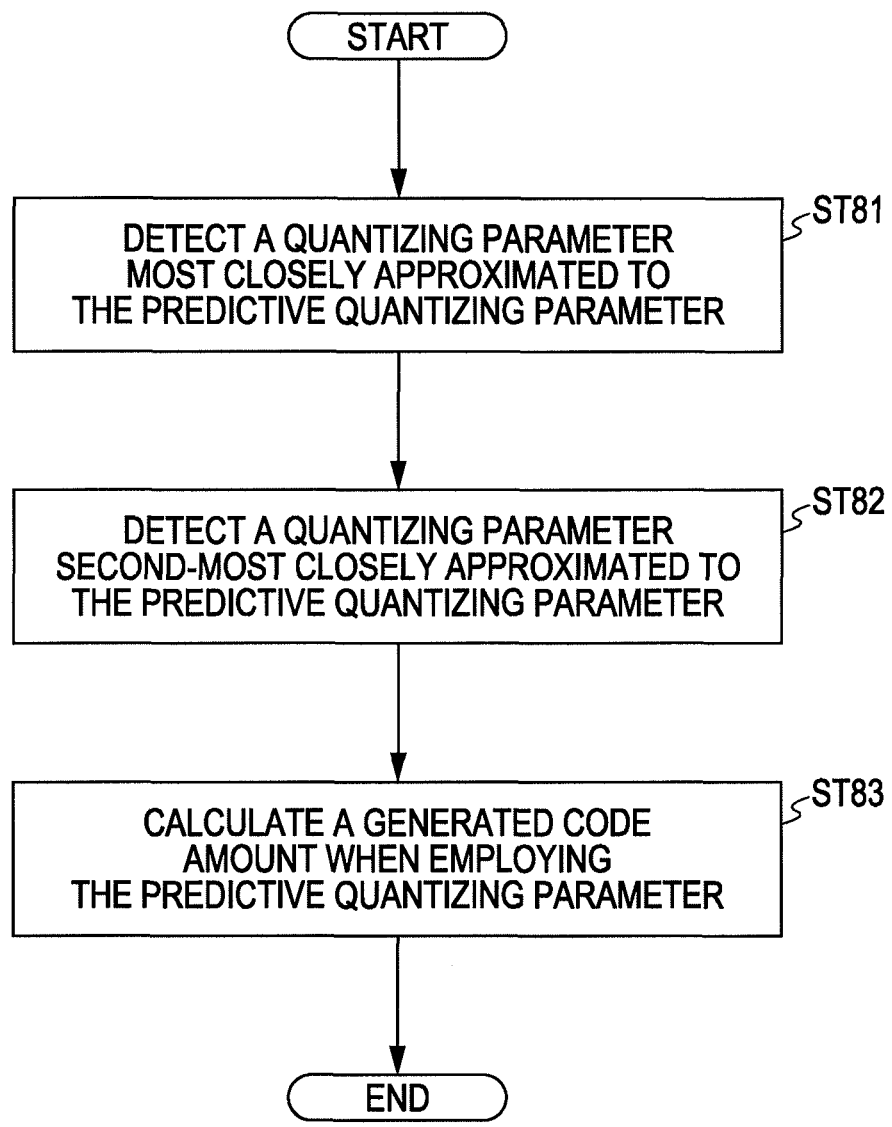
FIG. 9 is a flowchart illustrating second generated code amount detecting processing.

FIG. 9 is a flowchart illustrating second generated code amount detection processing. In step ST81, the code amount control unit 40 detects a quantizing parameter most closely approximated to the predicted quantizing parameter from quantizing parameters employed in the intra pre-encoding processing. The code amount control unit 40 detects a quantizing parameter most closely approximated to the quantizing parameter QP(t) out of the quantizing parameters QP(i0) through QP(i2) for example, takes this as a quantizing parameter QP(ia), and proceeds to step ST82.

In step ST82, the code amount control unit 40 detects a quantizing parameter second-most closely approximated to the predicted quantizing parameter out of the quantizing parameters employed in the intra pre-encoding processing. The code amount control unit 40 detects a quantizing parameter second-most closely approximated to the quantizing parameter QP(t) out of the quantizing parameters QP(i0) through QP(i2) for example, takes this as a quantizing parameter QP(ib), and proceeds to step ST83.

In step ST83, the code amount control unit 40 calculates the generated code amount of the predicted quantizing parameter. The code amount control unit 40 uses the generated code amount BT(ia) at the time of employing the quantizing parameter QP(ia), and the generated code amount BT(ib) at the time of employing the quantizing parameter QP(ib) to perform interpolation processing. The code amount control unit 40 performs linear interpolation, curve interpolation, or the like as the interpolation processing to calculate the generated code amount BT(it) of the predicted quantizing parameter QP(t).

The code amount control unit 40 uses, such as illustrated in FIG. 6 for example, the generated code amount BT(i1) of the quantizing parameter QP(i1) most closely approximated to the quantizing parameter QP(t), and the generated code amount BT(i0) of the quantizing parameter QP(i0) second-most closely approximated to the quantizing parameter QP(t) to perform the interpolation processing. The code amount control unit 40 calculates the generated code amount BT(it) of the predicted quantizing parameter QP(t) by the interpolation processing.

The code amount control unit 40 thus detects the generated code amount BT(it) of the predicted quantizing parameter QP(t), and proceeds from step ST44 to step ST45 in FIG. 8.

In step ST45, the code amount control unit 40 calculates a correction coefficient. The code amount control unit 40 uses the first generated code amount BT(pt) detected from the pre-encoding processing results, and the second generated code amount BT(it) detected from the intra pre-encoding processing results to perform the calculation of Expression (1) to calculate a correction coefficient C(i), and proceeds to step ST46.

$$C(i)=BT(it)/BT(pt) \qquad (1)$$

In step ST46, the code amount control unit 40 calculates high-frequency component cost. The code amount control unit 40 calculates high-frequency component cost H(i) indicating the state of a high-frequency component in an I picture.

Figure 10:
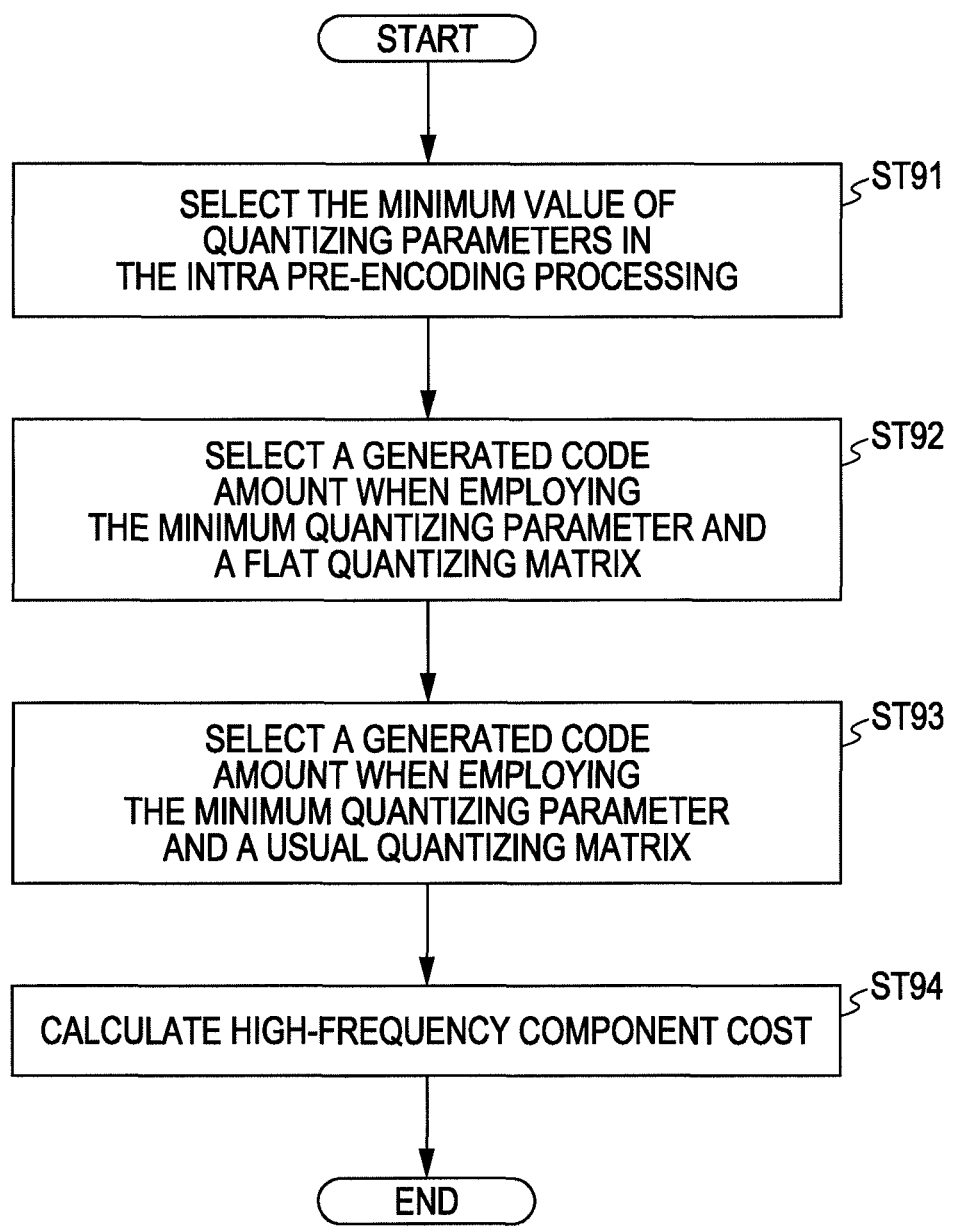
FIG. 10 is a flowchart illustrating the operation of high-frequency component cost calculation.
Figure 11:
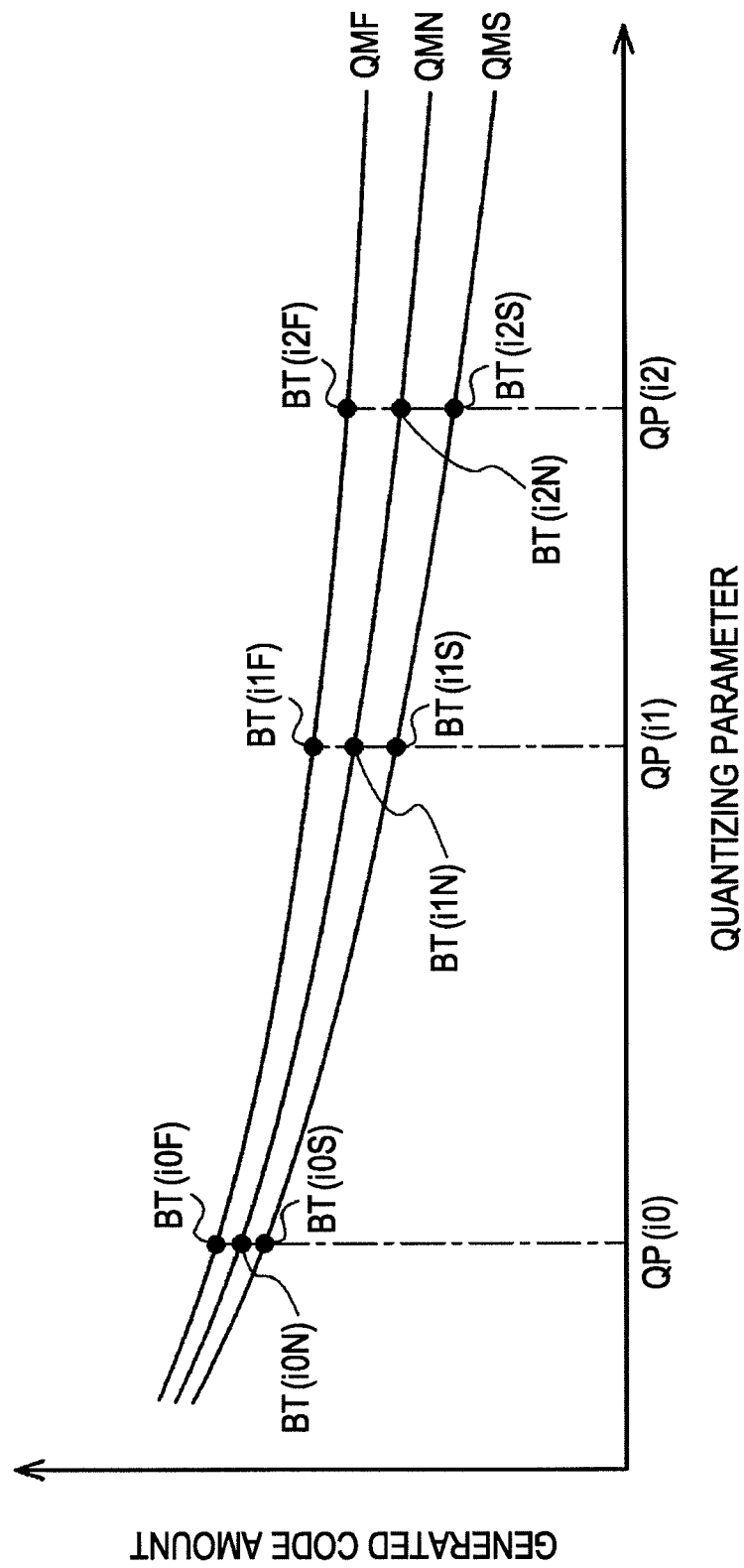
FIG. 11 is a diagram illustrating the processing results of intra pre-encoding processing.

FIG. 10 is a flowchart illustrating high-frequency component cost calculating operation. Also, FIG. 11 illustrates the processing results of the intra pre-encoding processing.

In FIG. 10, in step ST91 the code amount control unit 40 selects the minimum value of the quantizing parameters in the intra pre-encoding processing. For example, such as illustrated in FIG. 11, with the intra pre-encoding processing, in the event that quantizing parameters QP(i0), QP(i1), and QP(i2) (QP(i0)<QP(i1)<QP(i2)) are employed, the code amount control unit 40 selects the quantizing parameter QP(i0), and proceeds to step ST92.

In step ST92, the code amount control unit 40 selects a generated code amount when employing the smallest quantizing parameter, and a quantizing matrix of which the quantizing steps from a high frequency to a low frequency are flat. For example, the quantizing matrix QMF will be a matrix of which the matrix values are fixed values, and the quantizing steps from a high frequency to a low frequency are flat. The quantizing matrix QMN will be a matrix wherein the matrix value of a high frequency is a value greater than that of a low frequency, and a high frequency is roughly quantized as compared to a low frequency. The quantizing matrix QMS will be a matrix wherein the matrix value of a high frequency is a further great value as compared to the quantizing matrix QMN, and quantization is performed in a state in which reduction of high frequency components is steep as compared to the quantizing matrix QMN. In this case, as the quantizing parameter QP(i0) is selected as the smallest quantizing parameter, the code amount control unit 40 selects the generated code amount BT(i0F) at the time of employing the quantizing parameter QP(i0) and the quantizing matrix QMF, and proceeds to the step ST93.

In step ST93, the code amount control unit 40 selects a generated code amount at the time of employing the smallest quantizing parameter, and a common quantizing matrix for roughly quantizing a high frequency as compared to a low frequency. For example, the code amount control unit 40 selects the generated code amount BT(i0N) at the time of employing the quantizing parameter QP(i0) and the quantizing matrix QMN, and proceeds to step ST94.

In step ST94, the code amount control unit 40 calculates high-frequency component cost. The code amount control unit 40 performs the calculation of Expression (2) to calculate high-frequency component cost H(i).

$$H(i)=BT(i0F)/BT(i0N) \tag{2}$$

When thus calculating high-frequency cost, the code amount control unit 40 proceeds from step ST46 to step ST48 in FIG. 8, and performs the calculation of the predicted first generated code amount. The code amount control unit 40 performs the calculation of Expression (3) using the first generated code amount BT(pt) and the correction coefficient C(i) to calculate a corrected generated code amount BT(itc).

$$BT(itc)=BT(pt) \times C(i) \tag{3}$$

When thus performing the processing in FIG. 8, the generated code amount predicted from the results of the pre-encoding processing using the fixed quantizing parameter is corrected according to the processing results of the intra pre-encoding processing using multiple different quantizing parameters and multiple different quantizing matrices. Accordingly, the prediction accuracy of the generated code amount of an I picture can be improved.

Next, description will be made regarding non-I picture generated code amount calculation processing at the time of employing the predicted quantizing parameter using the flowchart illustrated in FIG. 12. In step ST111, the code amount control unit 40 detects a third generated code amount. The code amount control unit 40 classifies macro blocks into groups according to the generated code amount BT(p) at the time of performing encoding using the fixed quantizing parameter QP(p) at the pre-encoding unit 20. Also, the code amount control unit 40 selects a predictive curve of the corresponding group from multiple predictive curves indicating relationship between a quantizing parameter and a generated code amount provided for each group beforehand. Further, the code amount control unit 40 takes already predicted generated code amount BT(ut) in the quantizing parameter QP(t) using the selected predictive curve as the third generated code amount, and proceeds to step ST112.

In step ST112, the code amount control unit 40 calculates high-frequency component cost in a non-I picture. The code amount control unit 40 performs the same processing as the high-frequency component cost calculation shown in the above FIG. 10 to calculate high-frequency cost H(u) in a non-I picture. In this case, calculation of the high-frequency component H(u) is performed using Expression (4).

$$H(u)=BT(i0Fu)/BT(i0Nu) \tag{4}$$

Note that, in Expression (4), the generated code amounts BT(i0Fu) and BT(i0Nu) are generated code amounts at the time of subjecting the image data of a non-I picture for calculating high-frequency component cost to the intra pre-encoding processing as an I picture.

In this way, after calculating high-frequency cost in step ST112 in FIG. 12, the code amount control unit 40 proceeds to step ST113 to calculate a correction coefficient. The code amount control unit 40 performs the calculation of Expression (5) using the correction coefficient C(i) and the high-frequency component cost H(i) calculated in the I picture processing, and the high-frequency component cost H(u) calculated in step ST112 to calculate a correction coefficient C(ic) corresponding to a non-I picture, and proceeds to step ST115.

$$C(ic)=C(i) \times H(i)/H(u) \tag{5}$$

In step ST115, the code amount control unit 40 performs correction of a third generated code amount. The code amount control unit 40 performs the calculation of Expression (6) using the generated code amount BT(ut) and the correction coefficients C(ic) to calculate a corrected generated code amount BT(utc).

$$BT(utc)=BT(ut) \times C(ic) \tag{6}$$

When thus performing the processing in FIG. 12, the generated code amount predicted from the results of the pre-encoding processing using the fixed quantizing parameter is corrected according to the processing results of the intra pre-encoding processing using multiple different quantizing parameters and multiple different quantizing matrices. Accordingly, the prediction accuracy of the generated code amount of a non-I picture can be improved.

Such as described above, with the code amount control unit 40, a quantizing parameter for realizing the target generated code amount, and a generated code amount at the time of employing this quantizing parameter, are predicted based on the generated code amount calculated by performing pre-encoding at the pre-encoding unit 20. Also, the predicted generated code amount is corrected according to the generated code amount calculated by performing pre-encoding at the intra pre-encoding unit 30. Further, with the code amount control unit 40, a quantizing parameter is determined so that the generated code amount after correction realizes the target generated code amount. Therefore, for example, in the case that relationship between the generated code amount and quantizing parameter of a macro block is changed according to an image, predictive error of a generated code amount caused due to this change is corrected according to the generated code amount calculated by performing pre-encoding at the intra pre-encoding unit 30. Accordingly, even in the case that relationship between the generated code amount and quantizing parameter of a macro block is changed according to an image, prediction of a generated code amount can accurately be performed.

For example, in the case that prediction of a generated code amount is performed by performing the pre-encoding processing, and the quantizing parameter of main encoding is determined from the prediction result, as a cause for generating error of prediction, when the number of high-frequency components is smaller than estimation, the falling way of a generated code amount is changed, and the number of actual generated code amount becomes smaller than prediction. In particular, when difference between the quantizing parameter (p) fixed in the pre-encoding processing and the quantizing parameter QP(t) corresponding to the target generated code amount is great, error tends to become great. In order to correct this error, the code amount control unit 40 takes advantage of the generated code amount obtained by the intra pre-encoding processing for I pictures. The intra pre-encoding unit 30 applies multiple different quantizing parameters, and accordingly, the generated code amount of a quantizing parameter approximated to the predicted quantizing parameter can be obtained as compared to the pre-encoding unit 20. Therefore, with prediction of an I picture, the predicted generated code amount is corrected according to the generated code amount calculated at the intra pre-encoding unit 30.

Also, error is not allowed to be obtained regarding a non-I picture. However, this error fluctuates due to the state of a high-frequency component in a picture, and accordingly, the state of a high-frequency component is obtained from each picture, and the generated code amount of a non-I picture is corrected according to difference of each picture as to the state of a high-frequency component in an I picture.

Thus, even in the event that the state of a high-frequency component differs from that at the time of obtaining a predictive curve, the generated code amount can be corrected according to the state of a high-frequency component of a picture, and accordingly, the generated code amount can be presumed in a more accurate manner. Accordingly, for example, prediction of 1 GOP worth of generated code amount can accurately be performed.

Also, in the event that the main encoding unit 60 has performed encoding of image data using the basic quantizing parameter determined at the code amount control unit 40, encoded data of which the generated code amount is equal to or smaller than the target generated code amount, having little deterioration in an image, can be output from the main encoding unit 60.

Note that in the event that the number of high-frequency components is small, for example, when difference between a generated code amount at the time of employing the quantizing matrix QMF, and a generated code amount at the time of employing the quantizing matrix QMN is great, a generated code amount can accurately be predicted by performing the pre-encoding processing. Accordingly, when distinction is made based on high-frequency component cost that image data includes many high-frequency components, the code amount control unit 40 may correct the predicted generated code amount according to the generated code amount calculated at the intra pre-encoding unit 30. For example, when the percentage of a generated code amount at the time of employing the quantizing matrix QMF as to at the time of employing the quantizing matrix QMN increases dude to the property change of an image, or the like, and the high-frequency component cost exceeds a predetermined set value, the code amount control unit 40 may perform correction according to the generated code amount calculated at the intra pre-encoding unit 30. In this case, within a GOP for example, repeatedly switching of a picture to be corrected according to the generated code amount calculated at the intra pre-encoding unit 30 and a picture not to be corrected may result in deterioration in image quality. Accordingly, in the event that switching regarding whether or not the predicted generated code amount is corrected according to the generated code amount calculated at the intra pre-encoding unit 30 has been performed within a GOP, operation after switching is continued until the final picture of the GOP. Thus, deterioration in image quality due to repeatedly switching of a picture to be corrected according to the generated code amount calculated at the intra pre-encoding unit 30 and a picture not to be corrected within the GOP can be prevented.

Also, a series of processing described in the present Specification may be executed by hardware, software, or a combined configuration of both. In the case of executing processing by software, a program in which processing sequence is recorded may be executed by being installed in memory within a computer housed in dedicated hardware, or may be executed by being installed in a general-purpose computer capable of executing various types of processing.

For example, the program may be recorded beforehand in a hard disk or ROM (Read Only Memory) serving as a recording medium, or may be temporarily or eternally stored (recorded) in a removable medium such as a flexible disk, CD-ROM (Compact Disc Read Only Memory), MO (Magneto Optical) disk, DVD (Digital Versatile Disc), a magnetic disk, semiconductor memory, or the like. Such a removable medium may be provided as so-called packaged software.

Note that the program may be transferred from a download site to a computer wirelessly, or by cable via a network such as a LAN (Local Area Network), the Internet, or the like in addition to being installed in a computer from a removable recording medium such as described above. The computer can receive the program thus transferred so as to be installed in a recording medium such as a built-in hard disk or the like.

The present application contains subject matter related to that disclosed in Japanese Priority Patent Application JP 2009-173909 filed in the Japan Patent Office on Jul. 27, 2009, the entire content of which is hereby incorporated by reference.

Note that the present invention is not to be interpreted in a manner restricted to the above embodiments of the invention. With the embodiments of the present invention, the present invention has been disclosed in an exemplification mode, and it is apparent that one skilled in the art can conceive various modifications or alternations without departing from the essence and spirit of the present invention. That is to say, in order to understand the essence and spirit of the present invention, the Claims should be referred to.

What is claimed is:
1. An image encoding device comprising:
 a first encoding unit configured to perform encoding of image data using a fixed quantizing parameter to calculate a first generated code amount;

a second encoding unit configured to perform encoding of said image data using a plurality of different quantizing parameters for each of said quantizing parameters as the image data of an ultra picture to calculate a second generated code amount for each of the different quantizing parameters;

a code amount control unit configured to determine a quantizing parameter by performing prediction of (a) a predicted quantizing parameter for realizing a target generated code amount based on the first generated code amount, and (b) a predicted generated code amount at the time of employing this quantizing parameter based on the first generated code amount calculated at said first encoding unit, and the code amount control unit configured to correct this predicted generated code amount according to the second generated code amounts calculated at said second encoding unit when said target generated code amount is for 1 GOP (group of pictures) such that the generated code amount after correction is equal to or smaller than said target generated code amount and when said target generated code amount is not 1 GOP of the corrected generated code amount, prediction of the predicted generated code amount and correction thereof are performed by changing a parameter value of the predicted quantizing parameter; and a third encoding unit configured to perform encoding of said image data using the quantizing parameter determined at said code amount control unit.

2. The image encoding device according to claim 1, wherein, said code amount control unit determines, from the first and second generated code amounts calculated at said first and second encoding units of 1 GOP (Group of Picture), a quantizing parameter as to this 1 GOP.

3. The image encoding device according to claim 2, wherein said code amount control unit calculates, at the time of an intra picture being encoded at said first encoding unit, a generated code amount at the time of performing encoding using said predicted quantizing parameter from the second generated code amount calculated at said second encoding unit, and takes this calculated generated code amount as said generated code amount after correction.

4. The image encoding device according to claim 3, wherein said second encoding unit uses a plurality of different quantizing matrices to perform said second generated code amount calculation for each of the quantizing matrices;

and wherein said code amount control unit calculates, at the time of a picture different from an intra picture being quantized at said first encoding unit, high-frequency component cost indicating a state of a high-frequency component from the second generated code amount calculated at said second encoding unit, corrects said predicted generated code amount according to a percentage of the high-frequency component cost of a picture different from said intra picture as to the high-frequency component cost of said intra picture, and takes this as said generated code amount after correction.

5. The image encoding device according to claim 3, wherein said code amount control unit selects, from the second generated code amounts calculated at said second encoding unit, one generated code amount at the time of employing a quantizing parameter closest to said predicted quantizing parameter, and another generated code amount at the time of employing a quantizing parameter second closest to said predicted quantizing, parameter, and calculates the predicted generated code amount at the time of performing encoding using said predicted quantizing parameter from these selected one and another generated code amounts.

6. The image encoding device according to claim 4, wherein said code amount control unit uses one generated code amount at the time of employing the smallest quantizing parameter, and quantizing matrix of which the high-frequency component is not suppressed, and another generated code amount at the time of employing the smallest quantizing parameter, and a quantizing matrix of which the high-frequency component is suppressed to calculate said high-frequency cost.

7. The image encoding device according to claim 1, wherein in the event that said image data has been distinguished to include many high-frequency components, said code amount control unit corrects said predicted generated code amount according to the second generated code amount calculated at said second encoding unit.

8. The image encoding device according to claim 7, wherein in the event that switching has been performed regarding whether or not said predicted generated code amount is corrected according to the second generated code amount calculated at said second encoding unit within a GOP, said code amount control unit continues operation after switching until a final image of the GOP.

9. An image encoding method comprising the steps of:
first encoding, performed by a first encoding unit, of image data using a fixed quantizing parameter to calculate a first generated code amount;
second encoding, performed by a second encoding unit, of said image data using a plurality of different quantizing parameters for each of said quantizing parameters as the image data of an intra picture to calculate a second generated code amount for each of the different quantizing parameters;
determining, with a code amount control unit, of a quantizing parameter by performing prediction of a predicted quantizing parameter for realizing a target generated code amount based on the first generated code amount, and (b) a predicted generated code amount at the time of employing this quantizing parameter based on the first generated code amount calculated at said first encoding unit, and correcting of this predicted generated code amount according to the second generated code amounts calculated at said second encoding unit when said target generated code amount is for 1 GOP (group of pictures) such that the generated code amount after correction is equal to or smaller than said target generated code amount and when said target generated code amount is not 1 GOP of the corrected generated code amount, prediction of the predicted generated code amount and correction thereof are performed by changing a parameter value of the predicted quantizing parameter; and
third encoding, performed by a third encoding unit, of said image data using the quantizing parameter determined at said code amount control unit.

* * * * *